United States Statutory Invention Registration [19]

[11] Reg. Number: H508

Mark [43] Published: Aug. 2, 1988

[54] HYBRID-DRIVE IMPLOSION SYSTEM FOR ICF TARGETS

[75] Inventor: James W. Mark, Danville, Calif.

[73] Assignee: The United States of America as represented by the United States Department of Energy, Washington, D.C.

[21] Appl. No.: 108,183

[22] Filed: Oct. 14, 1987

[51] Int. Cl.[4] ..... G21B 1/00

[52] U.S. Cl. ..... 376/103; 376/104; 376/105

[56] References Cited

PUBLICATIONS

Nature, 239, (1972) pp. 139–142, Nuckolls et al.
Phys. Rev. Lett. 35, (1975), pp. 848–851, Clauser.
Physics Letters, 114A, (1986), pp. 458–464, Mark.

*Primary Examiner*—Harvey E. Behrend
*Attorney, Agent, or Firm*—Gary C. Roth; I. E. Carnahan; Judson R. Hightower

[57] ABSTRACT

Hybrid-drive implosion systems (20,40) for ICF targets (10,22,42) are described which permit a significant increase in target gain at fixed total driver energy. The ICF target is compressed in two phases, an initial compression phase and a final peak power phase, with each phase driven by a separate, optimized driver. The targets comprise a hollow spherical ablator (12) surroundingly disposed around fusion fuel (14). The ablator is first compressed to higher density by a laser system (24), or by an ion beam system (44), that in each case is optimized for this initial phase of compression of the target. Then, following compression of the ablator, energy is directly delivered into the compressed ablator by an ion beam driver system (30,48) that is optimized for this second phase of operation of the target. The fusion fuel (14) is driven, at high gain, to conditions wherein fusion reactions occur. This phase separation allows hydrodynamic efficiency and energy deposition uniformity to be individually optimized, thereby securing significant advantages in energy gain. In additional embodiments, the same or separate drivers supply energy for ICF target implosion.

4 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HYBRID-DRIVE IMPLOSION SYSTEM FOR ICF TARGETS

The U.S. Government has rights to this invention pursuant to Contract No. W-7405-ENG-48 between the U.S. Department of Energy and the University of California, for the operation of Lawrence Livermore National Laboratory.

BACKGROUND OF THE INVENTION

The invention described herein relates generally to inertial confinement fusion (ICF), and more particularly to methods and apparatus for reducing the input energy requirement for driving ICF targets.

The avowed purpose of ICF is to produce relatively tiny but powerful thermonuclear explosions by imploding small DT-filled targets to ignition conditions. The very energetic thermonuclear products released from the explosions are intended to be used to produce electricity, to provide high-energy x-rays and neutrons for important scientific experiments, and to accomplish many other useful and beneficial goals. Even though ICF targets are driven by presently existing means to provide modest quantities of thermonuclear energy, the full realization of the potential of ICF will only be reached with the routine attainment of thermonuclear yields in excess of about 0.1 ton, TNT equivalent.

In operation, ICF targets are presently set and kept in motion by either one or the other of two distinctly different types of driver. As described by Nuckolls et al in Nature 239, 139 (1972), ICF targets may be driven by lasers. Alternatively, as set forth by Clauser in Phys. Rev. Lett. 35, 848 (1975), ICF targets may be driven by ion beams, where the ions may include electrons and charged atoms or groups of atoms. The gain of an ICF target is defined as the ratio of the amount of thermonuclear energy released by the target, to the amount of energy provided by the driver. The gains of all presently existing ICF target systems, be they laser or ion beam driven, are considerably less than unity. Clearly, for any ICF target system to be practically viable, its gain will have to be well in excess of unity. The gain of any ICF target system is functional of many parameters, such as uniformity of target illumination, driving pulse shape, photon energy in the case of laser drivers, and particle species and energy in the case of ion beam drivers. Additionally, with all other parameters held fixed, the gain of any ICF target system is usually increased by increasing the amount of energy provided by the driver, at least within the range of driver energies that are presently available. It is finally pointed out that the best and most efficient ICF target drivers that presently exist, even though they are incapable of providing gains of or in excess of unity, are huge and extremely complicated, extradordinarily expensive pieces of scientific apparatus—with sizes measured in hundreds of feet and costs measured in hundreds of millions of dollars.

It is, therefore, apparent that any methods or apparatus for increasing ICF target gain, while keeping the amount of available driver energy fixed, would be of extraordinary importance to making the goals of ICF more attainable.

SUMMARY OF THE INVENTION

It is, therefore, an object of the invention to provide method and apparatus, operative at fixed driver energy, for increasing the gain of an ICF target system.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the method and apparatus of this invention comprises driving the implosion of an ICF target in two phases, with the target being driven in each of the phases with a separate driver. The ICF target comprises at least a hollow spherical ablator surroundingly disposed around a quantity of fusion fuel. Of course, the target may additionally comprise other elements, as appropriate. In driving the target, the ablator is first compressed to higher density by laser beams. After the ablator has been thus compressed, ion beams are then used to deliver energy into the compressed ablator. This direct energy deposition causes the ablator to implode, and compress the quantity of fusion fuel to conditions wherein fusion reactions occur.

In another embodiment of the invention, that is quite similar to the embodiment just described, instead of using laser beams to initially compress the ablator to higher density, this function is performed by a first quantity of ion beams. The subsequent delivery of energy into the compressed ablator is accomplished by a second quantity of ion beams, with the implosion and compression of the quantity of fusion fuel remaining as stated above.

The methodology of the invention, then, comprises compressing the ablator of an ICF target to higher density with laser beams, or, in another embodiment of the invention, with a first quantity of ion beams. The next step comprises delivering energy into the compressed ablator with an entirely independent quantity of ion beams. This implodes and compresses the quantity of fusion fuel within the ICF target to conditions wherein fusion reactions occur.

Since the apparatus and methods just described allow the gain of an ICF target to be increased, while the total amount of available driver energy is kept fixed, the present invention provides the benefits and advantages attendant upon making the ultimate goals of ICF more attainable.

BRIEF DESCRIPTION OF THE DRAWINGS

The accompanying drawings, which are incorporated in and form a part of the specification, illustrate two embodiments of the invention and, together with the description, serve to explain the principles of the invention. In the drawings.

DETAILED DESCRIPTION OF THE INVENTION

For any ICF target system to have a high gain, the dimensions of the ICF target must drastically reduce in size as the target is driven to implode. For both laser and ion beam drivers, the degree to which this may be accomplished depends upon energy deposition efficiency and uniformity, which together particularly limit the implosion symmetry that may be practically achieved. Since, generally speaking, in presently existing driver systems energy deposition efficiency and uniformity are optimized only in the neighborhood of a single target radius, as the target implodes these parameters quickly deteriorate. The implosion of an ICF target generally occurs in two phases: an initial compression phase, during which the target rapidly and very significantly diminishes in size, and a final peak power phase, during which the reduced dimensions of the target remain relatively static. The initial compression phase has especially high energy deposition uniformity requirements, and the final peak power phase is especially sensitive with respect to energy deposition efficiency, even though the two parameters are always of critical concern during the full course of the implosion.

The present invention comprises the realization that a vast improvement in gain, at fixed total driver energy, may be achieved by separately and optimally driving the two phases of ICF target implosion. The invention has six potential embodiments: laser-ion beam; ion beam-laser; laser-laser; ion beam-ion beam; single laser; and single ion beam. The present invention is discussed by the inventor, James Wai-Kee Mark, in Lawrence Livermore National Laboratory document UCRL-97110, dated July 24, 1987.

Figure 1:
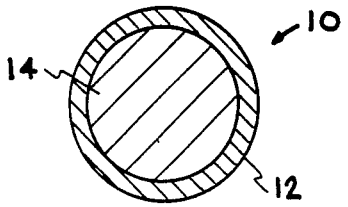
FIG. 1 is a cross-sectional, schematic view of an ICF target.

As a preliminary consideration, reference is first made to FIG. 1, which is a cross-sectional, schematic view of an ICF target 10. The target 10 is comprised of a hollow spherical ablator 12, that is surroundingly disposed around a quantity of fusion fuel 14. It is emphasized that the figure is very schematic. ICF targets are very well known in the prior art, and they can be of very great complexity, comprising many additional features and components than those shown in FIG. 1. For example, known ICF targets often have multiple internal regions for containing fuel or performing various hydrodynamic functions. Fusion fuel 14 may comprise deuterium, tritium, any other fusionable isotopes, in solid, liquid, and/or gaseous form. Ablator 12 may comprise any structural material such as aluminum or beryllium. Ablator 12 is so called because, in operation, material is ablated from the surface of ablator 12 to drive the inward implosion of the remaining portions of ICF target 10. The diameter of typical ICF targets, such as target 10, is usually on the order of one millimeter.

Figure 2:
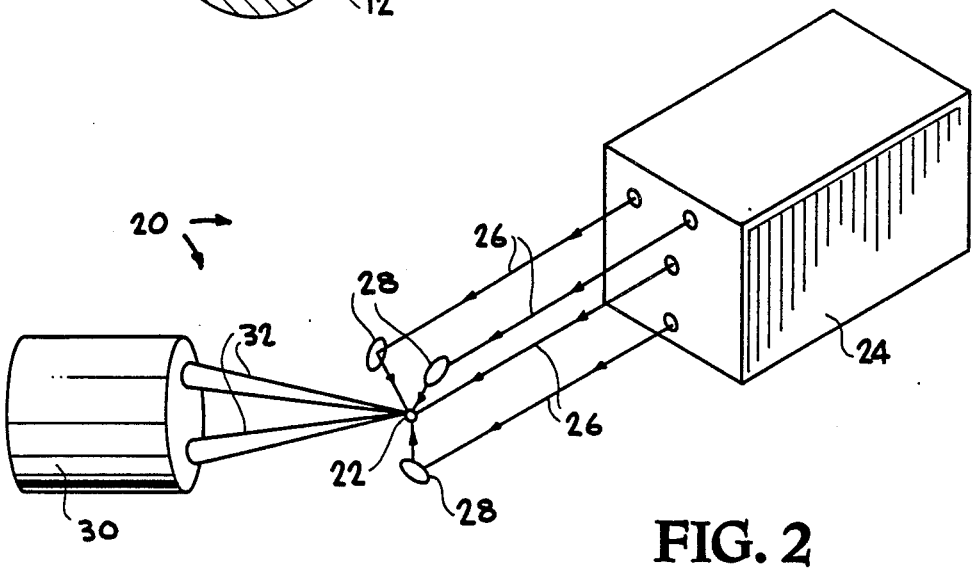
FIG. 2 is a perspective, schematic view of a hybrid-drive implosion system for an ICF target, made in accordance with the invention.

Reference is now made to the present preferred embodiment of the invention, which is illustrated in FIG. 2. This figure is a perspective, schematic view of a hybrid-drive implosion system 20 for an ICF target 22, made in accordance with the invention. ICF target 22 is exactly similar to target 10 of FIG. 1. In particular, target 22 comprises a hollow spherical ablator surroundingly disposed around a quantity of fusion fuel, which are not shown because of their very small size. Hybrid-drive implosion system 20 comprises a laser system 24, that provides laser beams 26. Beams 26 are shown reflected, by mirrors 28, to ICF target 22. As very well known in the prior art, laser beams 26 focus on ICF target 22 and compress the ablator of target 22 to higher density. As shown, laser system 24 and laser beams 26 schematically represent an axially symmetric illumination scheme as disclosed by Mark in Physics Letters 114 A, 458 (1986). In this Gaussian-quadrature illumination strategy, which is equally applicable to laser or ion beam drivers, the laser or ion beams are situated on the rims of cones whose angles are the zeroes of Legendre polynomials. The scheme achieves symmetry comparable to that achievable with the same number of beams placed uniformly over the surface of a sphere. The number of beams required is minimized if the beams have unequal powers, as appropriate. Thus, the ablator of ICF target 22 may very efficiently be compressed to higher density by laser beams 26 of laser system 24 by techniques that are well known and well established in the prior art. It is emphasized that this invention is in no way limited to the Gaussian-quadrature illumination strategy.

As further shown in FIG. 2, hybrid-drive implosion system 20 additionally comprises an ion beam system 30, that provides ion beams 32. Ion beam system 30 may be similar to any of the many presently known ion beam drivers for ICF targets. Ion beams 32 are focused by known magnetic or electrostatic focusing mechanisms, not shown, and caused to impinge upon ICF target 22 where they deliver energy into the ablator of target 22, after it has been compressed by laser beams 26 of laser system 24. It is particularly noticed that ion beam system 30 may be fashioned in an axially symmetric, Gaussian-quadrature illumination configuration as discussed above. The relative orientation of ion beam system 30 to laser system 24 need not be co-axial. Rather, the orientation may have any convenient configuration. The illumination geometry of ion beam system 30 and ion beams 32 is optimized to a target radius within the compressed ablator of target 22 so that energy is optimally delivered from ion beam system 30 to the ablator of target 22. Since most (approximately 80% in many situations) driver energy is delivered to the ICF target 22 during the second, ion beam driven, phase of operation, the optimization of energy delivery during this phase greatly increases ICF target gain. The energy delivered to the ablator of target 22 by ion beams 32 causes the ablator to implode and compress the quantity of fusion fuel within ICF target 22 to conditions wherein fusion reactions occur.

Figure 3:
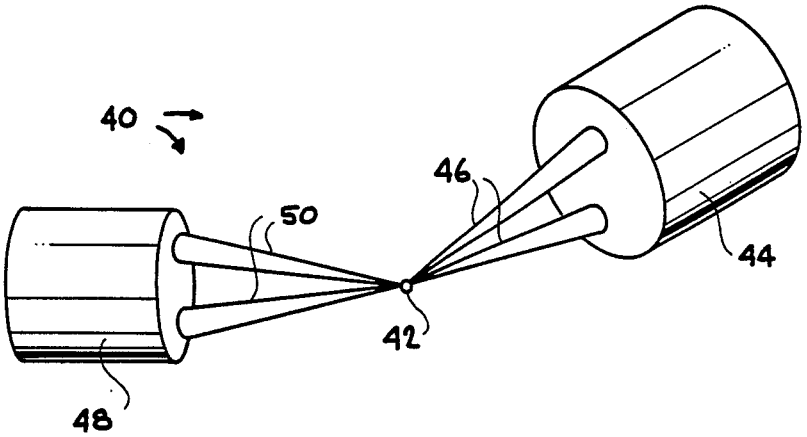
FIG. 3 is a perspective, schematic view of a second embodiment of a hybrid-drive implosion system for an ICF target, made in accordance with the invention.

Reference is now made to FIG. 3 which shows a second embodiment of the invention. The figure shows a hybrid-drive implosion system 40 for an ICF target 42, that is very similar to system 20 of FIG. 2, with the single exception that the first phase of ICF drive is performed by ion beams rather than laser beams. Once again, ICF target 42 is exactly similar to ICF target 10 of FIG. 1, and comprises a hollow spherical ablator surroundingly disposed around a quantity of fusion fuel, neither of which are shown in FIG. 3 because of their extremely small relative size. A first ion beam system 44 provides ion beams 46 that compress the ablator of ICF target 42 to higher density. Ion beam system 44 may be configured with the axially symmetric, Gaussian-quadrature illumination strategy discussed above, and energy delivery is optimized for compressing the ablator of ICF target 42 to higher density. The means of doing this are very well known in the prior art. After the ablator of ICF target 42 is thus compressed to higher density, a second ion beam system 48 provides ion beams 50 that directly deliver energy into the compressed ablator of target 42. Ion beam system 48 is described exactly as ion beam system 30 of FIG. 2. That is, ion beam system 48 may be configured with the axially symmetric, Gaussian-quadrative scheme as discussed above, and is optimized to a target radius within the compressed ablator of ICF target 42 so that energy is optimally delivered from ion beam system 48 to the ablator of ICF target 42. Because of this, the ablator of ICF target 42 implodes and compresses the quantity of fusion fuel within ICF target 42 to conditions wherein fusion reactions occur. Ion beam systems 44 and 48 may, but need not be co-axial, but rather may have any convenient relative relationship.

It is thus appreciated that the ICF hybrid-drive implosion systems 20 and 40, shown in FIGS. 2 and 3, respectively, illustrate methods and apparatus for increasing ICF target gain while keeping the total amount of available driver energy fixed, and will thus make the goals of ICF potentially more attainable.

The foregoing description of a preferred embodiment of the invention has been presented for purposes of illustration and description. It is not intended to be exhaustive or to limit the invention to the precise form disclosed, and obviously many modifications and variations are possible in light of the above teaching. For example, as mentioned above, four additional embodiments of this invention are potentially possible. They are, in addition to the two embodiments described in detail, a third embodiment wherein the first phase of ICF drive is performed with ion beams and the second phase with laser beams; a fourth embodiment wherein each of the two phases of ICF drive are performed by a separate laser system; a fifth embodiment wherein each of the two phases of ICF drive are performed by ion beams supplied by a single ion beam driver; and, a sixth embodiment wherein each of the two phases of ICF drive are performed by laser beams supplied by a single laser beam driver. In the last two embodiments, five and six, a single driver produces two multiplicities of driver beams which must be time delayed from one another and separately focused on the ICF target during each of the two separate phases of ICF target drive. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A driver for an ICF target that comprises a hollow spherical ablator surroundingly disposed around a quantity of fusion fuel, the driver comprising:

a laser system, that provides laser beams for compressing the ablator to higher density; and an ion beam system, that provides ion beams for delivering energy into the compressed ablator, so that the ablator implodes and compresses the quantity of fusion fuel to conditions wherein fusion reactions occur.

2. A method of driving an ICF target, that comprises a hollow spherical ablator surroundingly disposed around a quantity of fusion fuel, to conditions wherein fusion reactions occur, the method comprising the steps of:

compressing the ablator to higher density, with laser beams; and delivering energy into the compressed ablator, with ion beams, so that the ablator implodes and compresses the quantity of fusion fuel to conditions wherein fusion reactions occur.

3. A driver for an ICF target that comprises a hollow spherical ablator surroundingly disposed around a quantity of fusion fuel, the driver comprising:

a first ion beam system, that provides ion beams for compressing the ablator to higher density; and a second ion beam system, that provides ion beams for delivering energy into the compressed ablator, so that the ablator implodes and compresses the quantity of fusion fuel to conditions wherein fusion reactions occur.

4. A method of driving an ICF target, that comprises a hollow spherical ablator surroundingly disposed around a quantity of fusion fuel, to conditions wherein fusion reactions occur, the method comprising the steps of:

compressing the ablator to higher density, with a first quantity of ion beams; and delivering energy into the compressed ablator, with a second quantity of ion beams, so that the ablator implodes and compresses the quantity of fusion fuel to conditions wherein fusion reactions occur.

* * * * *